UNITED STATES PATENT OFFICE.

CHRISTOPHER RIS AND ERNST HAAGER, OF DUSSELDORF, GERMANY, ASSIGNORS TO CARL JÄGER, OF DUSSELDORF-DERENDORF, GERMANY.

BLUE DISAZO DYE.

No. 888,036. Specification of Letters Patent. Patented May 19, 1908.

Application filed December 21, 1907. Serial No. 407,597.

*To all whom it may concern:*

Be it known that we, CHRISTOPHER RIS, a citizen of the Swiss Republic, and ERNST HAAGER, a citizen of Germany, both residents of Dusseldorf, Germany, have invented new and useful Improvements in Blue Disazo Dye, of which the following is a specification.

This invention relates to the production of new blue disazo dyestuffs of the benzidin-series which possess an extraordinary strong affinity for the woolen fiber; besides they may serve for dyeing unmordanted cotton in the usual manner. In order to obtain these dyestuffs, the intermediate products obtainable by combination of the tetrazo compounds of the benzidin series with one molecule of 2.8 naphtholsulfo-acid (croceinic-acid) are further combined with one molecule of 1.8 aminonaphthol-4-sulfo-acid. They dye unmordanted cotton as well as wool in a boiling bath containing Glauber's salt bluish-violet to pure blue shades; especially on wool the shades show a great intensity and a remarkable fastness to fulling; by a further treatment with sulfate of copper they also become very fast to the action of light. The same affinity for the woolen fiber is not to be observed by other blue substantive disazodyes, for instance the known blue coloring-matters derived from dianisidin; in the new combination neither the croceinic-acid may be supplied, with the same effect, by another naphtholsulfo-acid nor instead of the 1.8 amino-naphthol-4-sulfo-acid the known 1.8 aminonaphtholdisulfo-acids may be used. Furthermore there is to be noted that, by effecting the combination in an inverted manner, that is to say by combining for instance the intermediate compound from tetrazodianisol and 1.8 aminonaphthol-4-sulfo-acid (see English Patent No. 16569/1892) at second place with one molecule of croceinic-acid, a dyestuff is obtained which is practically not identical with the new color, the latter producing much finer and stronger shades, especially on wool.

The following example shows the manner of carrying out this invention: 12.2 kilos dianisidin are converted into the tetrazocompound; then at a temperature of about 0 to 5° C. sodium carbonate is added till alkaline reaction is attained; then a solution of 12.3 kilos sodium salt of 2.8 naphtholsulfo-acid is left to run into the tetrazocompound; after stirring for some time, the formation of the intermediate product being accomplished, an alkaline solution of 11.9 kilos 1:8 aminonaphthol-4-sulfo-acid is added; after standing for several hours the mass is heated to boiling, the color precipitated with common salt, filtered off and dried. It forms a dark-blue powder with metallic luster, easily soluble in water, which solution is not changed by addition of caustic soda-lye; with concentrated sulfuric-acid a greenish-blue solution is obtained. The coloring-matter dyes unmordanted cotton as well as wool and mixed goods bright greenish-blue shades; when treated at boiling with sulfate of copper and a little acetic-acid the shades on wool are converted into dark indigo-blue of great fastness to fulling and light. From diaminoethoxydiphenyle, tolidin or benzidin according to this process similar dyestuffs are obtained, furnishing gradually more reddish-blue shades of the same dyeing-properties.

Having now described our invention and in what manner the same is to be performed, what we claim is—

1. The herein described new blue disazo-dyestuffs, obtainable by combination of the intermediate products derived from one molecule of the tetrazocompounds of the benzidin-series and one molecule of 2.8 naphtholsulfoacid (croceinic-acid) with one molecule of 1.8 aminonaphthol-4-sulfoacid, which dyestuffs form dark powders with metallic luster, easily soluble in water, soluble in concentrated sulfuric acid with blue color; and dyeing cotton and wool from reddish to greenish blue shades, substantially as hereinbefore described.

2. The herein described new blue disazo-dyestuff, obtainable by combination of the intermediate product derived from one molecule of the tetrazocompound of dianisidin and one molecule of 2.8 naphtholsulfoacid (croceinic-acid) with one molecule of 1.8 aminonaphthol-4-sulfoacid, which dyestuff forms a dark powder with metallic luster, easily soluble in water, which solution is not changed by addition of some caustic soda lye, soluble in concentrated sulfuric-acid with greenish-blue color; and dyeing cotton and wool bright blue shades, substantially as hereinbefore described.

Signed by us at Dusseldorf this 6th day of December 1907.

CHRISTOPHER RIS.
ERNST HAAGER.

Witnesses:
WILHELM FLASCHE,
CLEMENS HECKMANN.